US009925927B2

(12) United States Patent
Ogawa

(10) Patent No.: US 9,925,927 B2
(45) Date of Patent: Mar. 27, 2018

(54) CONSOLE BOX

(71) Applicant: CALSONIC KANSEI CORPORATION, Saitama (JP)

(72) Inventor: Toshiaki Ogawa, Saitama (JP)

(73) Assignee: CALSONIC KANSEI CORPORATION, Saitama (JP)

(*) Notice: Subject to any disclaimer, the term of this patent is extended or adjusted under 35 U.S.C. 154(b) by 0 days.

(21) Appl. No.: 15/314,302

(22) PCT Filed: May 11, 2015

(86) PCT No.: PCT/JP2015/063435
§ 371 (c)(1),
(2) Date: Nov. 28, 2016

(87) PCT Pub. No.: WO2015/182356
PCT Pub. Date: Dec. 3, 2015

(65) Prior Publication Data
US 2017/0190295 A1    Jul. 6, 2017

(30) Foreign Application Priority Data
May 29, 2014 (JP) .................................. 2014-110959

(51) Int. Cl.
*B60R 13/00* (2006.01)
*B60R 7/04* (2006.01)
(Continued)

(52) U.S. Cl.
CPC .................. *B60R 7/04* (2013.01); *B60K 1/04* (2013.01); *B60R 21/055* (2013.01)

(58) Field of Classification Search
CPC ................ B01D 9/0018; B01D 9/0036; H01L 2924/0002; B60V 1/145; B65D 5/705;
(Continued)

(56) References Cited

U.S. PATENT DOCUMENTS 7,029,048 B1*  4/2006  Hicks ..................... B60N 3/101
                                                        296/193.04
2002/0005424 A1*  1/2002  Lange ...................... B60R 7/04
                                                        224/539
(Continued)

FOREIGN PATENT DOCUMENTS

CN              103998293         8/2014
DE      10 2006 051 948           6/2008
(Continued)

OTHER PUBLICATIONS

International Search Report dated Jul. 7, 2015 in International (PCT) Application No. PCT/JP2015/063435.

*Primary Examiner* — Kiran B Patel
(74) *Attorney, Agent, or Firm* — Wenderoth, Lind & Ponack, L.L.P.

(57) ABSTRACT

A console box includes a console body including a pair of right and left side-walls, a storage container accommodated in the console body, a lid part openably placed in contact with upper edge parts of the console body, and an inwardly-bent part formed on the upper edge part of each side-wall of the console body, the inwardly-bent part being overlapped with the corresponding side-wall in an inside-and-outside direction so as to form a space part between the inwardly-bent part and the corresponding side-wall. The console box further includes an outwardly-bent part and a space-inserted part that are formed near an upper edge part of the storage container, and a rupture expected part provided at the outwardly-bent part, the rupture expected part being configured to be broken when an emergency load is applied to the lid part from above.

6 Claims, 6 Drawing Sheets

(51) Int. Cl.
 B60K 1/04 (2006.01)
 B60R 21/055 (2006.01)

(58) Field of Classification Search
 CPC .......... B60R 7/04; B60N 3/102; H04H 60/04;
 A61B 17/32002; A61B 2017/00482
 See application file for complete search history.

(56) References Cited

U.S. PATENT DOCUMENTS

| | | | | |
|---|---|---|---|---|
| 2007/0039477 | A1* | 2/2007 | Bowden | A47J 31/005 99/279 |
| 2009/0066103 | A1* | 3/2009 | Koarai | B60N 2/4606 296/24.34 |
| 2009/0134652 | A1 | 5/2009 | Araki | |
| 2009/0179449 | A1* | 7/2009 | Shibata | B60N 3/104 296/37.8 |
| 2010/0066115 | A1* | 3/2010 | Hipshier | B60N 2/4686 296/37.8 |
| 2011/0140475 | A1* | 6/2011 | Spitler | B60R 7/04 296/37.8 |
| 2011/0215605 | A1* | 9/2011 | Spitler | B60N 3/00 296/24.34 |
| 2012/0102677 | A1* | 5/2012 | Koarai | E05D 11/087 16/337 |
| 2013/0038279 | A1* | 2/2013 | Seyerle | B60R 16/033 320/108 |
| 2014/0197657 | A1* | 7/2014 | Gillis | B60R 7/04 296/37.8 |
| 2014/0333085 | A1 | 11/2014 | Yano et al. | |
| 2014/0346802 | A1* | 11/2014 | Horton | B60R 11/00 296/37.8 |
| 2016/0339847 | A1* | 11/2016 | Kodama | B60R 7/04 |
| 2017/0057416 | A1* | 3/2017 | Yang | B60R 7/04 |
| 2017/0088060 | A1* | 3/2017 | Buza | B60R 7/04 |
| 2017/0096109 | A1* | 4/2017 | Thomas | B60R 7/04 |
| 2017/0282808 | A1* | 10/2017 | Thomas | B60R 7/04 |

FOREIGN PATENT DOCUMENTS

| | | |
|---|---|---|
| EP | 2 075 160 | 7/2009 |
| EP | 2 792 549 | 10/2014 |
| JP | 6-199183 | 7/1994 |
| JP | 2009-126466 | 6/2009 |
| JP | 2010-30555 | 2/2010 |
| JP | 2013-124069 | 6/2013 |
| JP | 2014-205375 | 10/2014 |
| WO | 2013/088919 | 6/2013 |

* cited by examiner

CONSOLE BOX

CROSS-REFERENCE TO RELATED APPLICATION

The present application is based on and claims priority from Japanese Patent Application No. 2014-110959, filed on May 29, 2014, the disclosure of which is hereby incorporated by reference in its entirety.

TECHNICAL FIELD

This disclosure relates to a console box.

BACKGROUND ART

In a cabin of a vehicle such as a car, a center console is provided between a driver's seat and a front passenger seat, and the rear part of the center console is provided with a console box that is used as storage (see Patent Literature 1, for example).

This console box includes a console body having a pair of right and left side-walls, a storage container accommodated between the pair of right and left side-walls of the console body, and a lid part openably placed in contact with the upper edge parts of the pair of right and left side-walls of the console body (see JPH06-199183 A, for example).

Technical Problem

The above-mentioned console box, however, has following deficiencies. In these days, next-generation vehicles such as hybrid-vehicles, electric vehicles, and fuel-cell vehicles are being introduced and developed in the industry so as to improve energy efficiency and to reduce emission of global warming gas. Such next-generation vehicles are equipped with a larger battery than the conventional vehicles. Hence, the rear part of a center console is used to install a part of the battery, for example.

With this, the capacity of the console box is downsized by the part of the battery. Additionally, the storage container of the console box becomes shallow and is easily bottomed with respect to the battery since the part of the battery is installed right under the storage container.

As a result, when a load is emergently applied to the lid part from above, it is difficult to absorb the load sufficiently since the gap to the bottom of the storage container is not sufficiently deep.

A main object of this disclosure is therefore to solve the above problem.

Solution to Problem

In order to solve the above problem, a console box of this disclosure includes a console body that includes a pair of right and left side-walls, a storage container that is accommodated between the pair of right and left side-walls of the console body, a lid part that is openably placed in contact with upper edge parts of the pair of right and left side-walls of the console body, an inwardly-bent part that is formed on the upper edge part of each side-wall of the console body, the inwardly-bent part being formed by downwardly and inwardly bent in the console body to be overlapped with the corresponding side-wall in an inside-and-outside direction so as to form a space part between the inwardly-bent part and the corresponding side-wall, an outwardly-bent part that is formed at an upper edge part of the storage container, a space-inserted part that extends from the outwardly-bent part toward the space part, and a rupture expected part that is provided at the outwardly-bent part, the rupture expected part being configured to be broken when an emergency load is applied to the lid part from above.

BRIEF DESCRIPTION OF DRAWINGS

FIG. 5 is a vertical cross-sectional view in which FIG. 3 is partially enlarged.

DESCRIPTION OF EMBODIMENT

Hereinafter, an embodiment of this disclosure will be described with reference to the drawings. FIGS. 1 to 7 describe the embodiment of this disclosure.

Embodiment 1

As described later, with the console box of this disclosure, it is possible to absorb a load emergently applied to the lid part even if the gap to the bottom of the storage container is not sufficiently deep.

(Configuration) Hereinafter, the configuration of the embodiment will be described.

Figure 1:
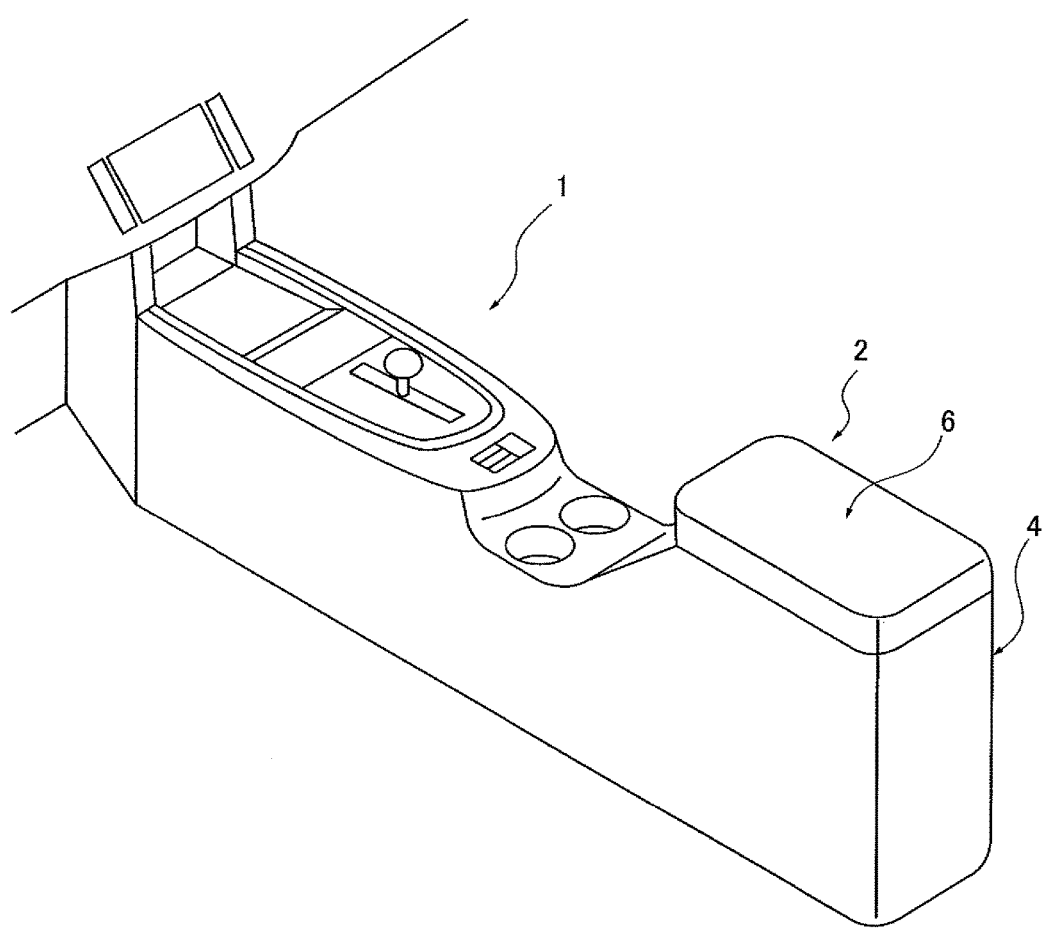
FIG. 1 is a perspective view of a center console equipped with a console box according to an Embodiment of this disclosure.

As illustrated in FIG. 1, a center console 1 is provided between a driver's seat and a front passenger seat in a cabin of a vehicle such as a car. Further, the rear part of the center console 1 is provided with a console box 2 that is used as storage.

Figure 2:
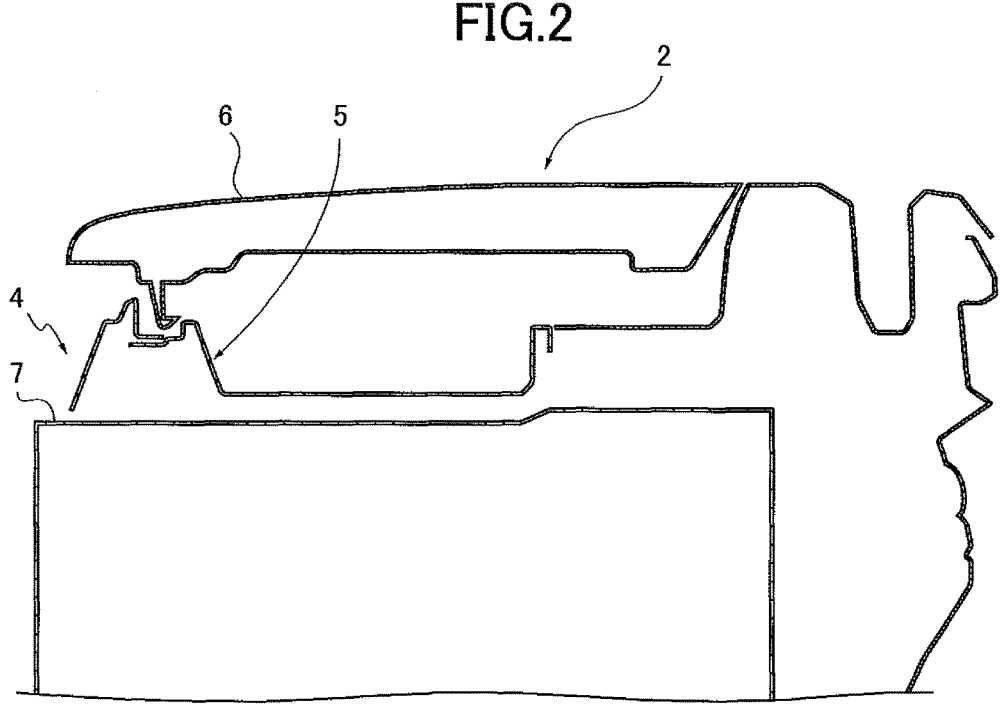
FIG. 2 is a vertical cross-sectional view of the console box shown in FIG. 1 which is taken along a vehicle longitudinal direction.
Figure 3:
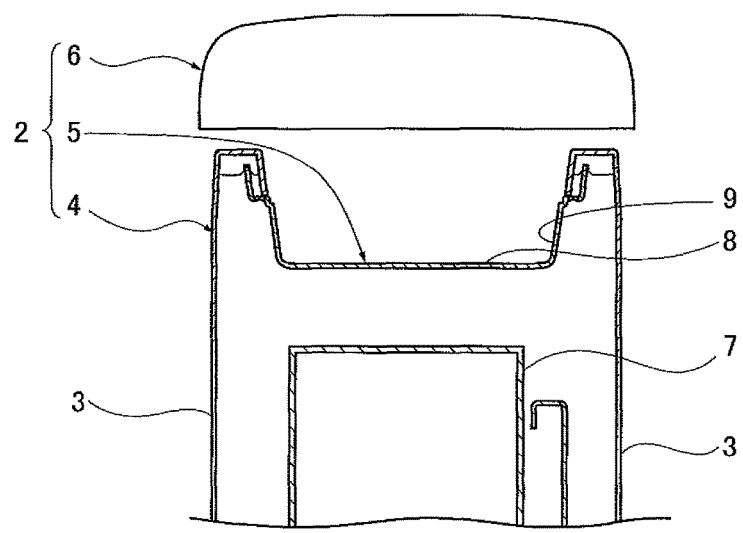
FIG. 3 is a vertical cross-sectional view of the console box shown in FIG. 1 which is taken along a vehicle width direction.

The console box 2 includes a console body 4 having a pair of right and left side-walls 3, a storage container 5 accommodated between the pair of right and left side-walls 3 of the console body 4, and a lid part 6 openably placed in contact with the upper edge parts of the pair of right and left side-walls 3 of the console body 4, as illustrated in sectional views of FIGS. 2 and 3.

Figure 4:
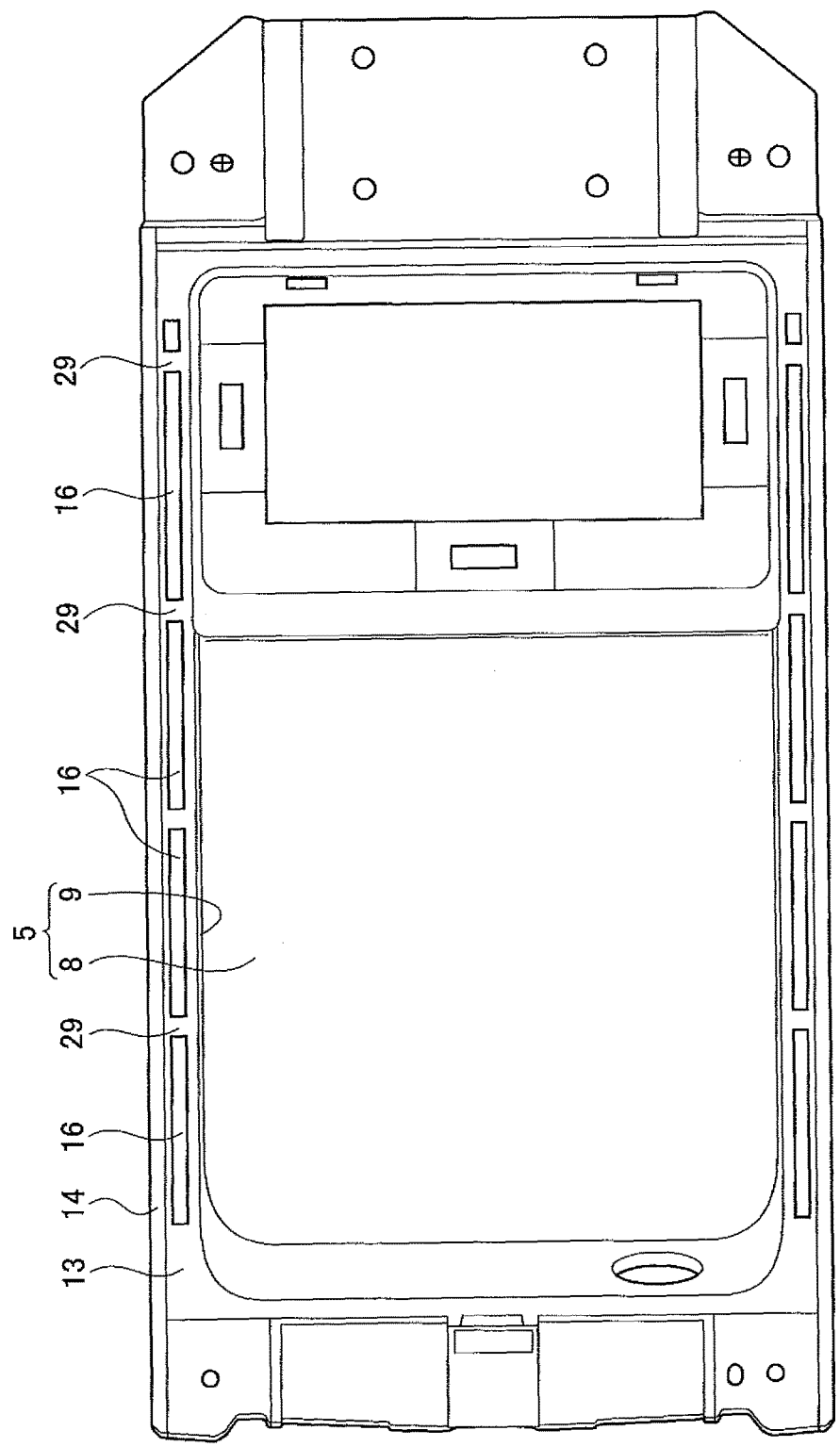
FIG. 4 is a plane view of the storage container shown in FIG. 2.

Here, a vehicle mounted object such as a battery 7 is installed right under the storage container 5, which is provided inside the console body 4. As a result, the shape of the storage container 5 becomes shallow, as illustrated in FIGS. 3 and 4. The storage container 5 includes a bottom face 8 and side faces 9 surrounding the bottom face 8.

With the above-mentioned configuration, the embodiment is configured to include the following components.

Figure 5:
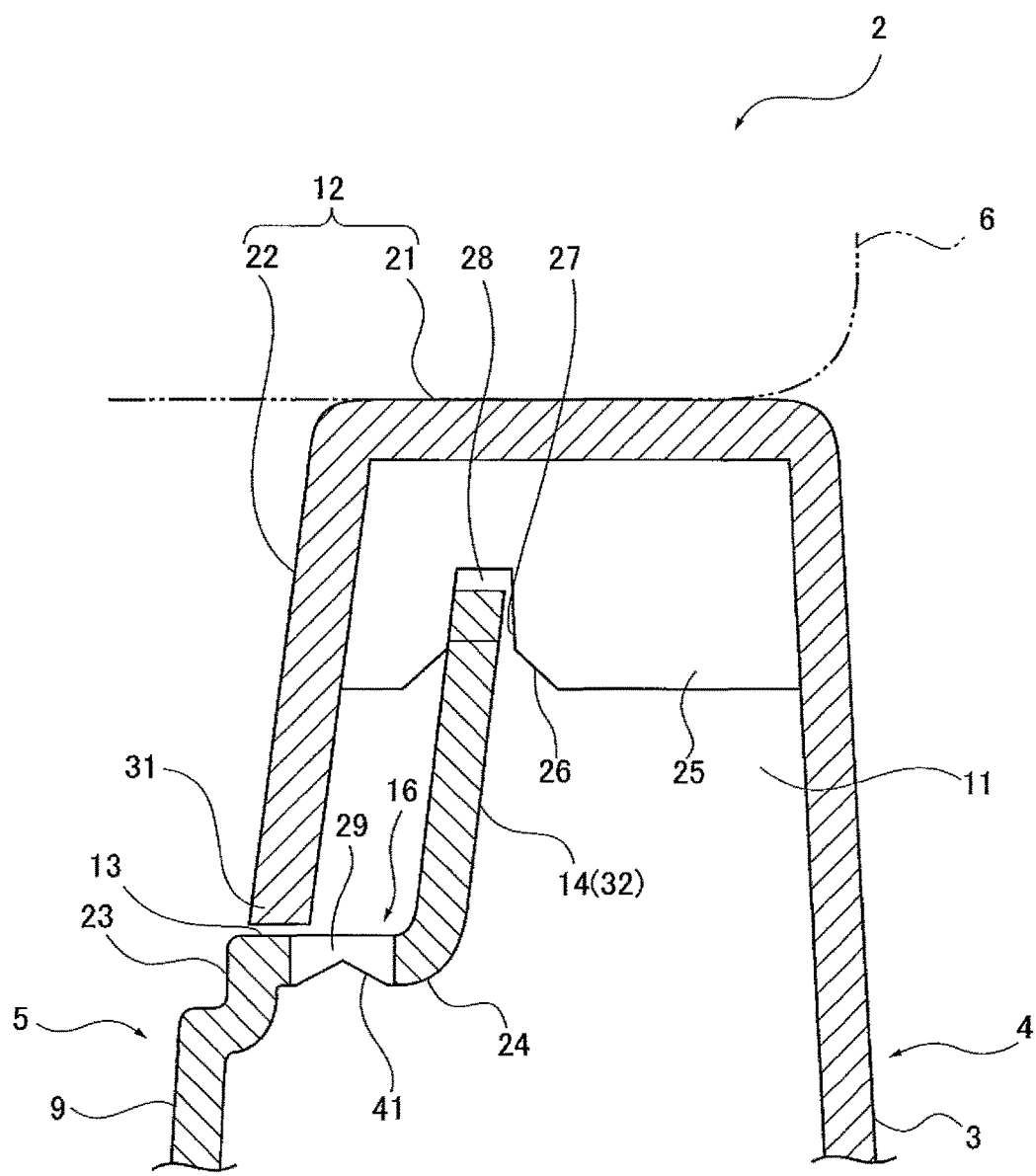
Figure 6:
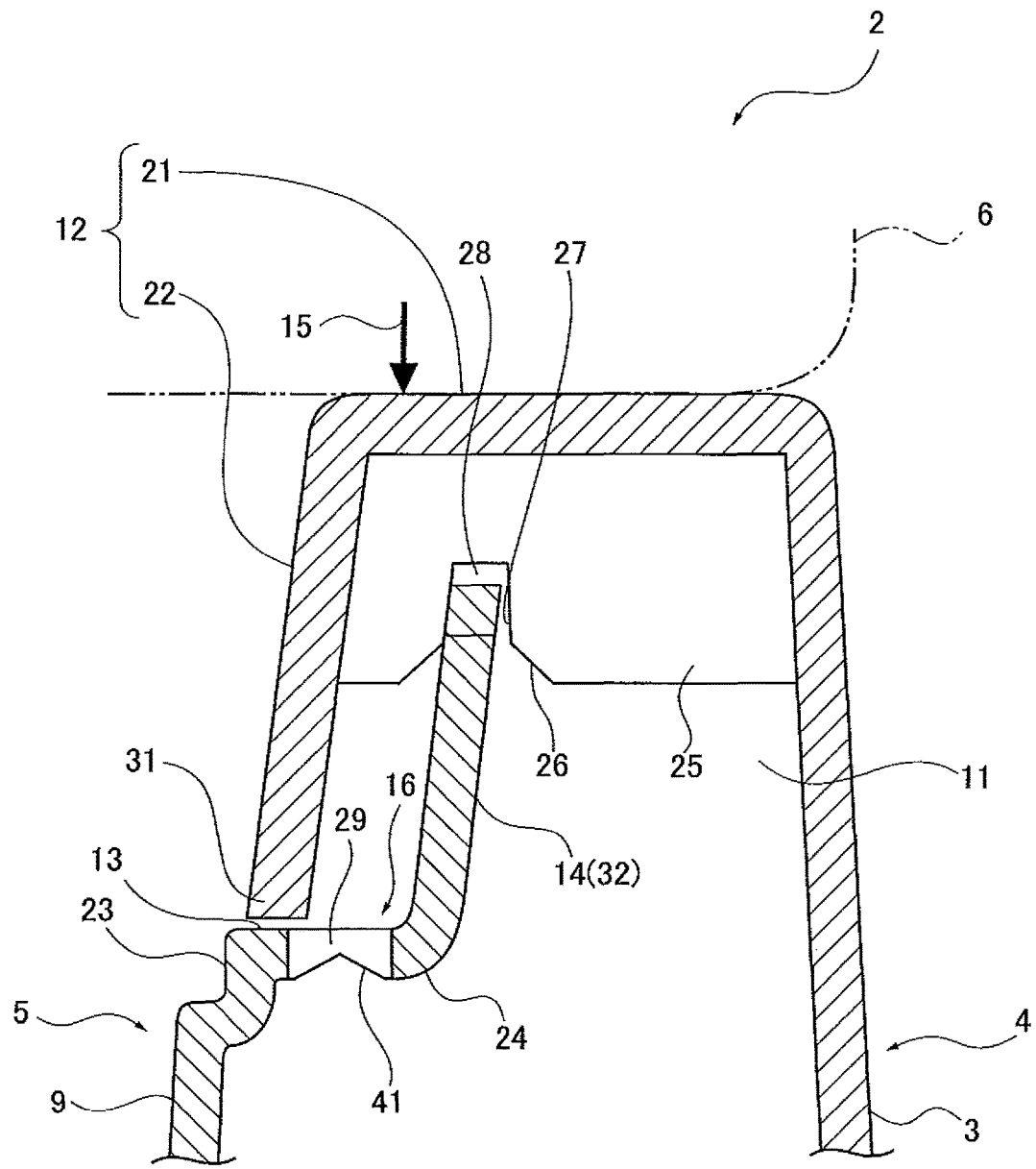
FIG. 6 is an operation chart.
Figure 7:
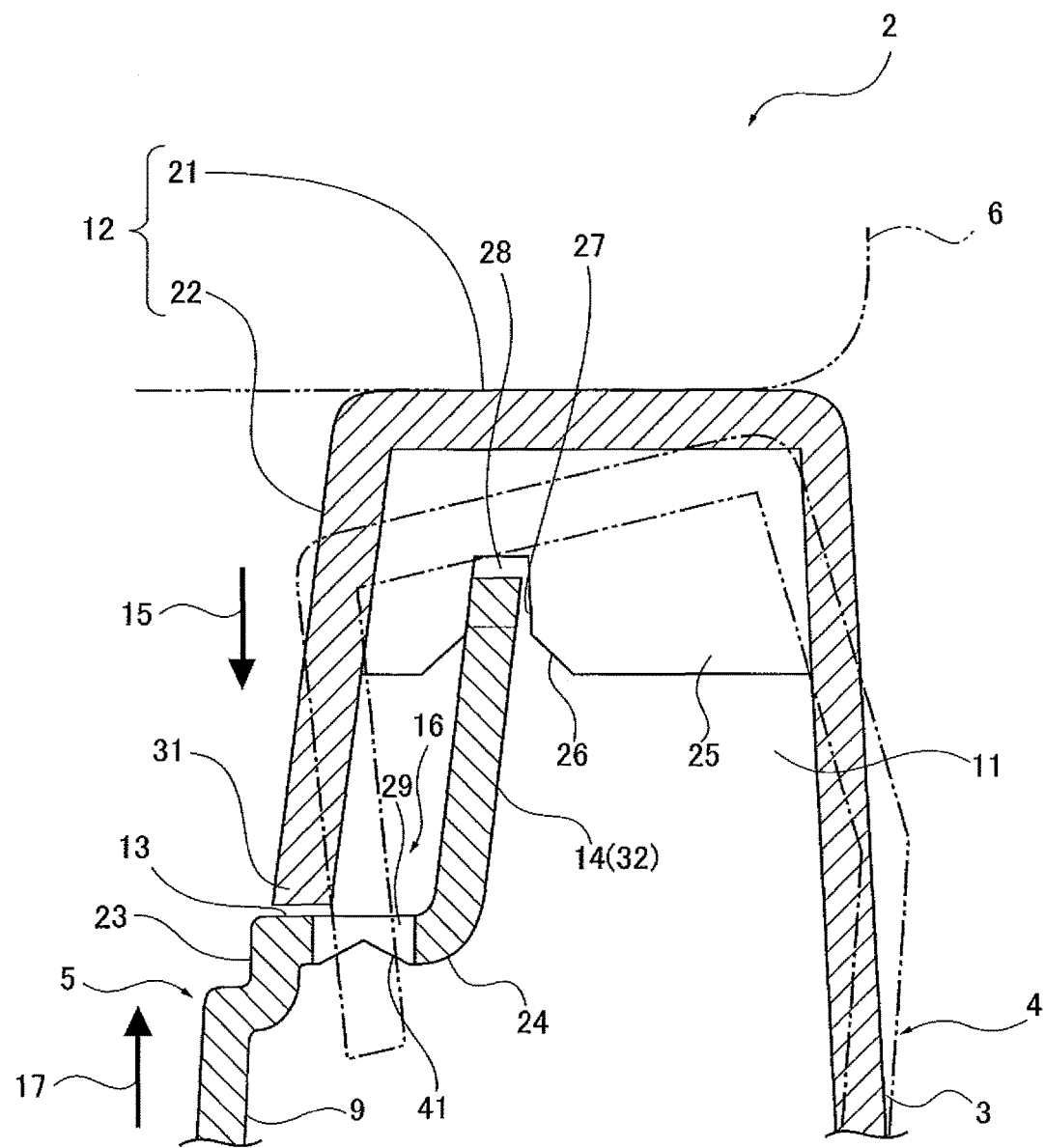
FIG. 7 is an operation chart which follows FIG. 6.

(1) As illustrated in FIG. 5, an enlarged partial view of FIG. 4, an inwardly-bent part 12 is formed on the upper edge part of each side-wall 3 of the console body 4. The inwardly-bent part 12 is downwardly and inwardly bent in the console body 4 to be overlapped with the corresponding side-wall 3 in an inside-and-outside direction so as to form a space part 11 therebetween. Further, an outwardly-bent part 13 is formed at the upper edge part of the storage container 5. Additionally, a space-inserted part 14 that extends from the outwardly-bent part 13 toward the space part 11 is provided. As illustrated in FIGS. 6 and 7, the outwardly-bent part 13 includes a rupture expected part 16 that is to be broken when an emergency load 15 is applied to the lid part 6 from above. Note that the upward arrow in FIG. 7 indicates a reaction force 17 generated when the storage container 5 is bottomed against the battery 7.

The inwardly-bent part 12 is configured to include, for example, a horizontal portion 21 and a falling portion 22. The outwardly-bent part 13 is provided on each of the right and left side faces 9 of the storage container 5. The outwardly-bent part 13 is formed to have a substantially horizontal flange-like shape. A step portion 23 is formed right under the outwardly-bent part 13. The step portion 23 shifts outward by about a thickness of the storage container 5.

The space-inserted part 14 includes an upper bent portion 24 at the outer edge of the outwardly-bent part 13 so as to extend upwardly. The length of the space-inserted part 14 is determined so as to be inserted into the space part 11. The space part 11 is, on the other hand, integrally provided with a rib 25 into which the upper end of the space-inserted part 14 is inserted. The rib 25 is provided with a tapered part 26 that guides the upper end of the space-inserted part 14 when the storage container 5 is assembled with the console body 4. Further, the rib 25 is formed with a cut part 27 at the innermost side (i.e., the above-mentioned side) of the tapered part 26. The cut part 27 has substantially the same width as the thickness of the space-inserted part 14 and extends in the same direction as the space-inserted part 14. The cut part 27 has the depth (height) such that the upper end of the space-inserted part 14 does not abut thereon under normal circumstances. That is, a gap 28 is formed between the cut part 27 and the upper end of the space-inserted part 14. Therefore, when an emergency load 15 is applied, the cut part 27 (the inwardly-bent part 12) and the space-inserted part 14 are both deformed and abut onto each other so as to optimally absorb the applied emergency load 15.

The rupture expected part 16 is formed with a slit part that is provided at the horizontal part of the outwardly-bent part 13 and extends in the vehicle longitudinal direction (see FIG. 4). This slit part is provided with a plurality of slits with a plurality of bridges 29 therebetween. The number and width of the bridges 29 are determined so as to optimize the rupture strength against the emergency load 15.

(2) A lower end 31 of the inwardly-bent part 12 is configured to extend toward the outwardly-bent part 13. The space-inserted part 14 is configured to tilt toward outside with respect to the up-and-down direction so as to form an outwardly-tilt part 32.

Here, the lower end 31 of the inwardly-bent part 12 is configured to be extended so as to be substantially in contact with the outwardly-bent part 13 or to have a small gap therebetween. The outwardly-bent part 13 is configured such that the bent width of the outwardly-bent part 13 is wider than the thickness of the lower end 31 of the inwardly-bent part 12. Note that it is preferred that the gap between the lower end 31 (of the falling portion 22) of the inwardly-bent part 12 and the outwardly-bent part 13 be smaller than the gap 28 between the upper end of the space-inserted part 14 and the inner face (i.e., the top part of the cut part 27) of the space part 11. With this, the lower end of the inwardly-bent part 12 abuts onto the outwardly-bent part 13 before the upper end of the space-inserted part 14 hits onto the inner surface of the space part 11 by the emergency load 15 and the rupture expected part 16 ruptures. As a result, the emergency load 15 is absorbed by the lower end of the inwardly-bent part 12. An outwardly-tilt part 32 is configured by tilting the space-inserted part 14 outwardly by about five (5) to ten (10) degrees with respect to the up-and-down direction.

(3) The rupture expected part 16 is configured to include a fragile part 41. The fragile part 41 functions as a starting point to break the rupture expected part 16 when an emergency load 15 is applied.

The fragile part 41 is, for example, a notch formed on or below each bridge 29.

(Action) Hereinafter, mechanical action of the embodiment will be described.

In the console box 2, when the lid part 6 is opened, the storage container 5 appears from the console body 4 having the pair of right and left side-walls 3. That is, goods can be stored in the storage container 5.

When an emergency load 15 is applied to the lid part 6 from above, the console body 4 is entirely moved downward by the emergency load 15 and the storage container 5, which is pressed by the console body 4, is also entirely moved downward and bottomed onto the top of the battery 7. The storage container 5 is then repelled by the reaction force 17 and moves upward. Accordingly, the console body 4 and the storage container 5 moves toward the opposite directions and interferes with each other.

If a gap to the bottom of the storage container 5 is not sufficiently deep, it is difficult to sufficiently absorb the emergency load 15.

(Effects) With this embodiment, the following effects are achieved.

(1) The inwardly-bent part 12 is provided at the upper edge part of each side-wall 3 of the console body 4. With this, the space part 11 is formed between the inwardly-bent part 12 and the upper edge part of each side-wall 3. Further, each of the upper edge parts of the side-walls 3 and the corresponding inwardly-bent part 12 are overlapped in the inside-and-outside direction (for example, the vehicle width direction). Additionally, the outwardly-bent parts 13 and the space-inserted parts 14 are provided near the upper end parts of the storage container 5.

As described above, the outwardly-bent parts 13 and the space-inserted parts 14 are provided near the upper edge parts of the storage container 5. With this, when the console body 4 and the storage container 5 are each moved to the opposite directions and interfered with each other, the outwardly-bent parts 13 are partially bent downwardly and generate supporting force. Therefore, it becomes possible to support the lid part 6 and to absorb the emergency load 15. Additionally, as the space-inserted part 14 is disposed inside the space part 11, it is easy to adjust the timing of the space-inserted part 14 to be hit to the inner surface of or the top part (i.e., the innermost side the cut part 27) of the inwardly-bent part 12 and/or to adjust the interference direction. Therefore, by appropriately determining the length and the tilt direction of the space-inserted part 14, it is possible to adjust the timing of the interference between the console body 4 and the storage container 5 and the absorption effect by optimizing the interference direction (hitting angle) of the space-inserted part 14. As a result, it is possible to absorb the emergency load 15 efficiently.

Further, the rupture expected part 16 is provided at the outwardly-bent part 13. With this, the rupture expected part 16 is covered by the inwardly-bent part 12 so that the rupture expected part 16 cannot be seen from outside. Besides, the outwardly-bent part 13 is bent downwardly to absorb an emergency load 15 and then the rupture expected part 16 absorbs the load 15. Therefore, it is possible to absorb more emergency load 15 than the conventional configuration.

Consequently, even when the gap to the bottom of the storage container 5 is not sufficiently deep, it is possible to absorb an emergency load 15 more and longer. Besides, it becomes possible to expand the capacity of the storage container 5.

(2) The lower end 31 of the inwardly-bent part 12 is configured to extend toward (the upper side of) the outwardly-bent part 13. With this, the inwardly-bent part 12 and the outwardly-bent part 13 integrally form the internal surface of the console box. Additionally, it is configured such that the lower end 31 of the inwardly-bent part 12 is reliably abutted onto the outwardly-bent part 13 when an emergency load 15 is applied to the lid part 6 from above. That is, the emergency load 15 is received by the outwardly-bent part 13, a bending point of the storage container 5, and then reliably transferred to the rupture expected part 16 through the outwardly-bent part 13.

Further, the space-inserted part 14 forms the outwardly-tilt part 32, which tilts outwardly with respect to the up-and-down direction. With this, when the console body 4 is moved downward by an emergency load 15 and the space-inserted part 14 of the storage container 5 abuts onto the inside section or the back side of the inwardly-bent part 12 of the console body 4, the space-inserted part 14 being tilted outwardly is deformed and tilted further outwardly. That is to say, the space-inserted part 14 (i.e., the outwardly-tilt part 32) has an optimal shape to absorb the emergency load 15 or to rupture the rupture expected part 16 by transferring the emergency load 15 to the rupture expected part 16.

Furthermore, as illustrated in FIG. 7 with broken lines, when the rupture expected part 16 ruptures, the lower end 31 of the inwardly-bent part 12 is deformed and guided between the outside of the side face 9 of the storage container 5 and the inside of the side-wall 3 of the console body 4. With this, it is possible to secure a sufficient deformation amount of the console box 2 against an emergency load 15 in the up-and-down direction.

(3) The rupture expected part 16 is configured to include the fragile part 41. With this, it becomes possible to rupture the rupture expected part 16 from the fragile part 41 when an emergency load 15 is applied. As a result, the rupture expected part 16 is reliably ruptured in an emergency situation. Besides, it becomes possible to control the rupturing timing of the rupture expected part 16 and/or to control how to break the rupture expected part 16.

(4) The gap is formed between the lower end (of the falling part 22) of the inwardly-bent part 12 and the outwardly-bent part 13, and this gap is smaller than the gap 28 between the upper end of the space-inserted part 14 and the inner face (i.e., the top part of the cut part 27 of the rib 25) of the space part 11. With this, the lower end of the inwardly-bent part 12 abuts onto the outwardly-bent part 13 before the upper end of the space-inserted part 14 hits on the inner face of the space part 11 and the rupture expected part 16 is ruptured by an emergency load 15. Therefore, it is possible to absorb the emergency load 15 with the lower end of the inwardly-bent part 12.

Although the embodiment has been described with reference to the drawings, it should be understood that the embodiment is only an example of this disclosure. This disclosure should not be limited to the embodiment, and it should be appreciated that variations or modifications may be made in the embodiments described by persons skilled in the art without departing from the gist of this disclosure. Further, when the embodiment includes a plurality of elements, any possible combinations of these elements may be possible even without a detailed description. Furthermore, when several embodiments are described in this disclosure, any possible combinations of these configurations that may even across these embodiments may be possible even without a detailed description. Additionally, when the term "and the like", is used, it means it covers similar elements. Further, when the terms "substantially", "about", "around", etc. are used, it should be considered that they cover ranges and/or accuracy within a technical common sense understood by persons skilled in the art.

REFERENCE SIGNS LIST

2 Console box; 3 Side-wall; 4 Console body; 5 Storage container; 6 Lid part; 11 Space part, 12 Inwardly-bent part; 13 Outwardly-bent part; 14 Space-inserted part; 15 Emergency load; 16 Rupture expected part; 28 Gap; 31 Lower end; 32 Outwardly-tilt part; 41 Fragile part

The invention claimed is:

1. A console box comprising:
a console body that includes a pair of right and left side-walls;
a storage container that is accommodated between the pair of right and left side-walls of the console body;
a lid part that is openably placed in contact with upper edge parts of the pair of right and left side-walls of the console body;
an inwardly-bent part that is formed on the upper edge part of each side-wall of the console body, the inwardly-bent part being formed by downwardly and inwardly bent in the console body to be overlapped with the corresponding side-wall in an inside-and-outside direction so as to form a space part between the inwardly-bent part and the corresponding side-wall;
an outwardly-bent part that is formed at an upper edge part of the storage container;
a space-inserted part that extends from the outwardly-bent part toward the space part; and
a rupture expected part that is provided at the outwardly-bent part, the rupture expected part being configured to be broken when an emergency load is applied to the lid part from above, wherein
the outwardly-bent part has a bent width wider than a thickness of a lower end of the inwardly-bent part, and
the rupture expected part is provided at the outwardly-bent part on a side closer to the space-inserted part than the lower end of the inwardly-bent part.

2. The console box according to claim 1, wherein
the rupture expected part is a bridge provided at a slit formed at the outwardly-bent part.

3. The console box according to claim 1, wherein
the lower end of the inwardly-bent part extends toward an abutting part provided at a base of the outwardly-bent part, and
a gap is formed between the lower end of the inwardly-bent part and the abutting part, the gap being smaller than a gap between an upper end of the space-inserted part and an inner face of the space part, such that an emergency load is absorbed at multiple stages when the lower end of the inwardly-bent part abuts onto the abutting part, when the upper end of the space-inserted part hits the inner face of the space part, and when the rupture expected part is ruptured.

4. The console box according to claim 1, wherein
the space part is provided with a rib that receives an upper end of the space-inserted part, the rib is formed with a cut part that has a width equal to a thickness of the space-inserted part and extends in a direction identical to the extending direction of the space-inserted part, and the cut part is engaged with the upper end of the space-inserted part.

5. The console box according to claim 1, wherein the space-inserted part is configured to tilt toward outside with respect to an up-and-down direction so as to form an outwardly-tilt part.

6. The console box according to claim 1, wherein the rupture expected part includes a fragile part that functions as a starting point to break the rupture expected part when an emergency load is applied.

* * * * *